INVENTOR.
JAMES L. SITOMER
BY Joseph J. Alakahanja
ATTORNEY

INVENTOR.
JAMES L. SITOMER
BY Joseph J. Alekshun Jr.
ATTORNEY

United States Patent Office

3,370,181
Patented Feb. 20, 1968

3,370,181
HIGH-SPEED TRANSISTORIZED SWITCHES PROVIDING MULTIPLE STABLE CURRENT LEVELS FOR INERTIAL INSTRUMENTS
James L. Sitomer, Middleton, Mass., assignor to Massachusetts Institute of Technology, Cambridge, Mass., a corporation of Massachusetts
Filed June 17, 1964, Ser. No. 375,815
10 Claims. (Cl. 307—247)

This invention relates generally to electronic current switches and, more specifically, relates to an improved electronic switch providing a multiplicity of precisely constant levels of current that is particularly suited for inertial instruments.

Constant current switching devices find wide application in inertial instruments. In single degree of freedom gyroscopes and linear accelerometers, for example, switching devices are utilized to energize the torque generators driving the incorporated inertial mass. The accuracy and performance of these instruments is highly dependent on the generation of constant torquing forces. As the torque generated is directly related to energizing current, the current supply should be constant and highly stable over the entire operating period, if instrument drift errors are to be kept to minimal levels.

Occasionally, the gyros and accelerometers of inertial guidance and navigation units must be capable of operating over more than one input range of angular velocity and linear acceleration. To provide this feature the current level supplied by switching devices must be readily scaled up or down in discrete steps in order to vary the maximum input signal range. Also, as the relative displacement of the inertial mass is a function of the angular velocity and acceleration of the embodying vehicle, certain inertial units measure these quantities by periodically sampling the relative displacement of the inertial mass. The higher the sampling rate the greater the accuracy of the measurement. To derive the combined features of high accuracy and variable operating range without interrupting performed measurements and the normal flow of information, it is therefore necessary that switches be capable of changing current levels between sampling signals. In some systems this means that switching must be completed in less than 100 microseconds.

Because of their favorable open and short-circuited characteristics, relays are commonly used to perform the above described switching operations. However, relays are relatively slow, and this inherent limitation usually dictates the maximum operating speed of the switch and the accuracy of the instrument.

With the general aim of improving the accuracy of inertial instruments and with view towards the limitations of relay type current switches, applicant has, as one object of his invention, to provide a high-speed electronic switch affording a number of levels of constant current.

It is another object of this invention to provide a switch wherein the available levels of current are stable, insensitive to temperature changes, and insensitive to long term drift attributable to the inherent instability of the components utilized.

It is a further object of the invention to provide a current level switch having a wide dynamic operating range.

These and other objects are met by an electronic switch combining a stable D-C amplifier and a high speed switching component. In accord with the broad concept of the invention, a highly stable electronic amplifier applies a constant voltage to a given load that is in series with the switching component. The switching component comprises a plurality of serially connected precision resistors, at least one resistor always being in series with the load, and includes a like plurality of transistor switches. When triggered on, each transistor is switched into a saturated condition and provides a short-circuit between a resistor junction and a reference voltage potential. The number of resistor-transistor switch combinations equals ($n$) the number of distinct current levels afforded by the switch. In operation, one or more resistors in the switching component are in series with the load. When a new current level is required, the appropriate switching transistors are triggered and short-out more or less of the series resistors, simultaneously causing the current to be scaled by a discrete step to a new level. Because of the rapid switching properties of transistors, the switch can change current levels at an extremely fast rate. In the preferred embodiment, the invention features a highly stable differential feedback amplifier as its source of constant voltage. In this embodiment, the circuit parameters are selected so that the current is directly proportional to the feedback voltage and inversely proportional to the combined resistance of the precision resistors. For this reason the current supplied to the load is capable of being maintained at a precisely stable level, and is independent of inherent transistor drift.

Further objects, features, and advantages of the present invention and a better understanding of its operation will be apprehended from the following detailed description, taken in conjunction with the accompanying drawings in which.

Figure 1:
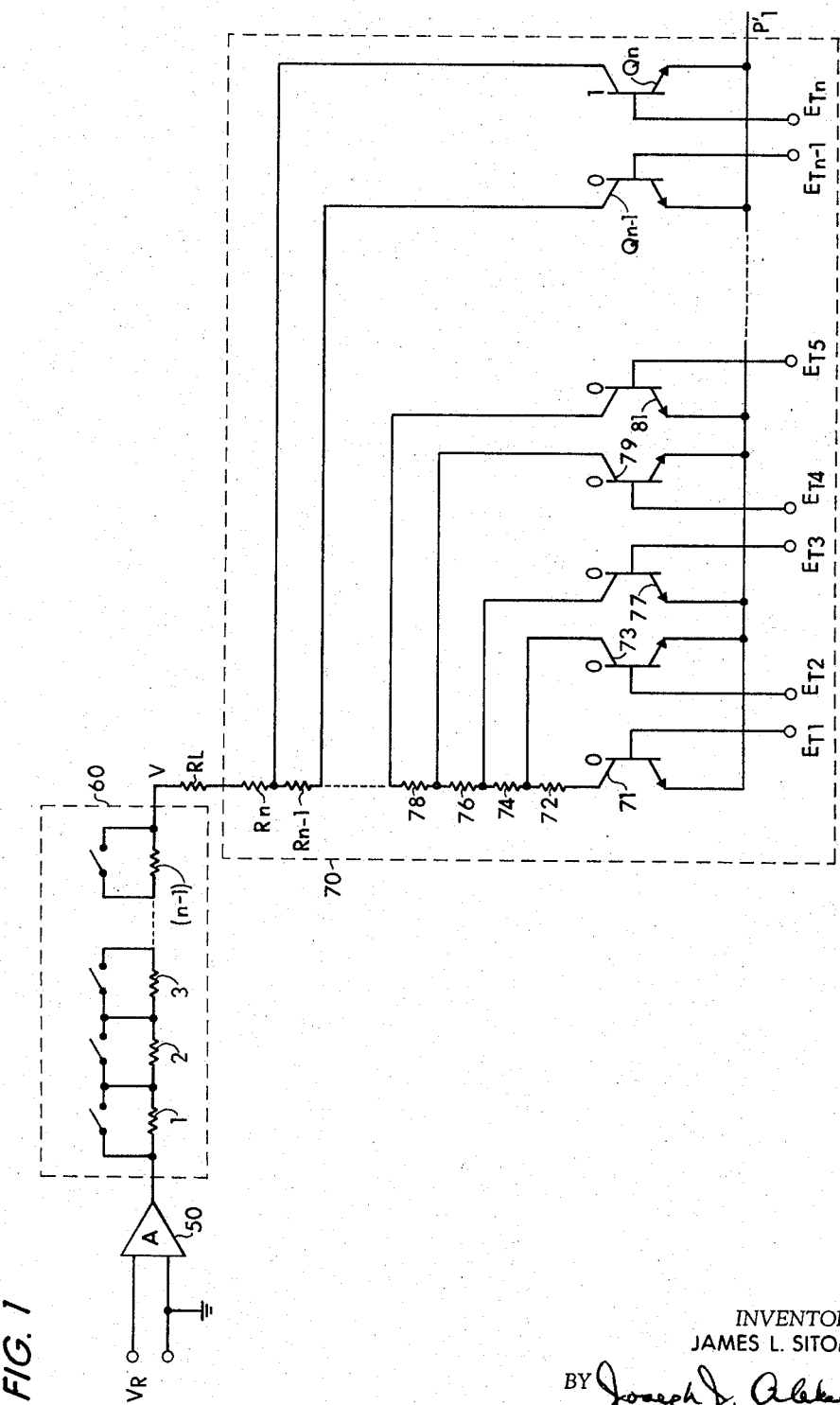
FIG. 1 is a block diagram illustrating the broadest concept of the invention in the form of an $n$-current level switch.

Referring to FIG. 1, the invention basically comprises an extremely stable amplifier 50 applying a constant voltage V to a given load $R_L$ that is in series with the switching component 70. Amplifier 50 receives a constant reference $V_R$, and also uses an ($n-1$) level range scaler 60 for varying its dynamic operating range. Range scaler 60 consists of ($n-1$) consecutive parallel combinations of a resistor and a shorting element; the shorting element, as will be explained in a description of the preferred embodiment, preferably comprising a transistor shorting switch activated by a flip-flop. The range scaler functions to maintain V within the dynamic operating range of the amplifier. For example, when switching component 70 is triggered to increase the level of the load current, one of the switches of scaler 60 is simultaneously closed so that the amplifier can satisfactorily maintain output voltage V. The dynamic range of the amplifier is maximized when all shorting switches are closed and all resistive elements by-passed. In switching component 70 a plurality ($n$) of serially connected precision resistors 72, 74, 76, 78 . . . $R_{n-1}$, $R_n$ is connected to load $R_L$. The switch component also contains a like number of shorting transistors 71, 73, 77, 79 . . . $Q_{n-1}$, $Q_n$. The open-circuit impedance of each transistor is high relative to the resistance of the corresponding resistor. The number of shorting transistors and corresponding resistors equals the number ($n$) of current levels to be supplied to the load.

The operating state illustrated in FIG. 1 for the respective shorting transistors presents minimum impedance to voltage V. Consistent with digital terminology, transistor state "0" implies cutoff, whereas state "1" indicates the transistor is in its saturated or "on" condition and essentially has a short-circuit between collector and emitter terminals. Thus as denoted by the symbols of FIG. 1, the junction of resistors $R_{n-1}$ and $R_n$ is connected through the short-circuit of transistor $Q_n$ to the reference voltage potential $P'_1$, which may be ground potential. All remaining resistors are by-passed. Because only resistor $R_n$ is in series with voltage V, load $R_L$ receives maximum current. When it is desired to decrease the current to its next steady state level, "on" and "off" signals are simultaneously applied to terminals $E_{Tn-1}$ and $E_{Tn}$, respectively. Upon application of the two triggering signals, the short circuit to ground shifts from transistor $Q_n$ to transistor $Q_{n-1}$. As resistors $R_n$ and $R_{n-1}$ are inserted in the circuit, the current is decreased by a step to its next to highest amplitude level. The load current is further reduced in discrete steps by similar and sequential shifting of the short circuit to transistors 81, 79, and 77 etc. until the last step reduction in current occurs. The minimum current level is attained when an "on" signal is applied to terminal $E_{T1}$, concurrent with an "off" signal to terminal $E_{T2}$. As the respective states of transistors 73 and 71 are reversed, the last resistor 72 of the switching component is thereby added in series with the load.

Likewise, the load current is increased from its minimum level in discrete steps. For example, when transistors 71 and 73 are triggered so the short-circuit reverts back to transistor 73, the load current is increased by a unit step to its next to lowest constant amplitude level. If it is desired to increase the current by more than one unit level, the appropriate transistor is triggered "on" and, accordingly, all resistors successive to the corresponding resistor are by-passed. For instance, to increase the load current back to its next to highest level, transistor $Q_{n-1}$ need only be triggered "on," and all resistors following resistor $R_{n-1}$ are switched out of the load circuit.

Figure 2:
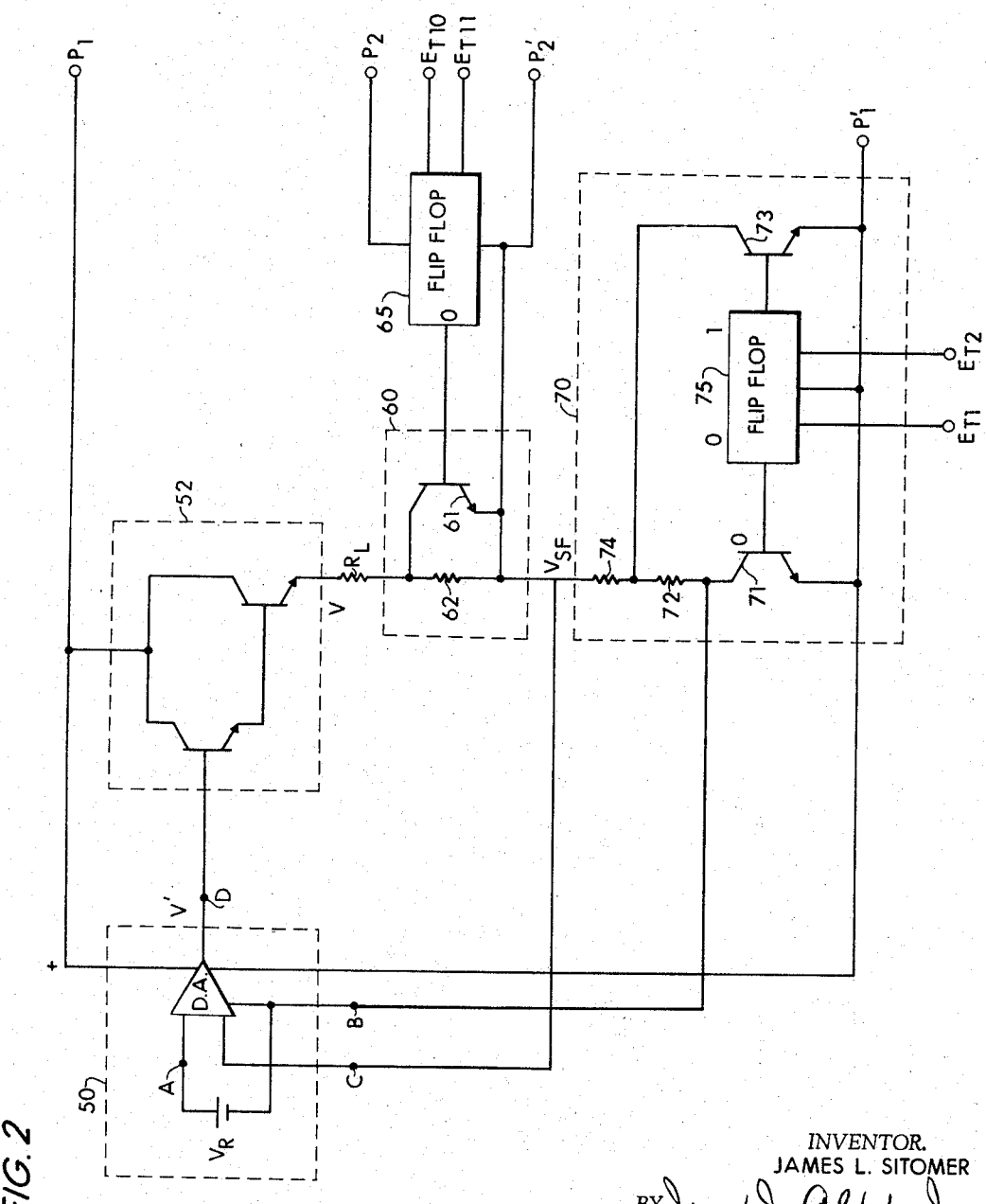
FIG. 2 is a block diagram of a two level switch employing a D-C feedback amplifier as its source of constant voltage.

A more preferred embodiment and specific application of the invention is illustrated in the block diagram of FIG. 2. In FIG. 2, a differential feedback amplifier provides the source of constant voltage. Again a reference voltage $V_R$ is incorporated by the amplifier. A sampling signal $V_{SF}$ appearing at the input terminal of component 70 is fed back to amplifier input terminal C. The difference between reference voltage $V_R$ and the sampling voltage $V_{SF}$ constitutes the input signal to the amplifier. As will be later explained, amplifier 50 is a high gain device requiring a Darlington connected pair emitter follower to reduce the output impedance to a suitable value. In the circuit of FIG. 2, dynamic range scaler 60 comprises a parallel combination of resistor 62 and switching transistor 61. Flip-flop 65 varies the range scale when appropriate electrical pulses are applied to terminals $E_{T10}$ or $E_{T11}$. Terminal $P_2$ is a power source having a return terminal $P'_2$. Terminal $P'_2$ also serves as a floating reference for transistor 61 and flip-flop 65.

Although the embodiment of FIG. 2 may be adopted to provide a number of current levels, in which case additional components would be incorporated in range scaler 60 and switching component 70 consistent with FIG. 1, the circuit of FIG. 2 is specifically designed for applications requiring only two stable levels of load current. For instance, some gyros or accelerometers are designed to operate over two input ranges and thus require only two levels of constant current. Assuming this requirement, switching component 70 embodies two series resistors 74 and 72 and two corresponding transistor switches 71 and 73. A complementary triggering device, such as flip-flop 75, is specifically suited for switching transistors states. This electronic switch is principally powered by a D-C power source applied between terminals $P_1$ and $P'_1$. Terminal $R'_1$ also serves as a floating voltage reference potential for switching transistors 71 and 73 and flip-flop 75. Terminal B serves as a floating voltage reference point for voltage source $V_R$. The circuit mode of FIG. 2 provides the load with its maximum level of current.

Consistent with circuit operation as described above, the load current is reduced by a discrete step upon application of an "on" triggering signal to terminal $E_{T1}$ of flip-flop 75 or an "off" signal to terminal $E_{T2}$. Either triggering signal will insert resistor 72 in series with load $R_L$. Concurrently, flip-flop 65 is pulsed and switches transistor 61 into saturation. This changes the dynamic operating range of the amplifier.

Figure 3:
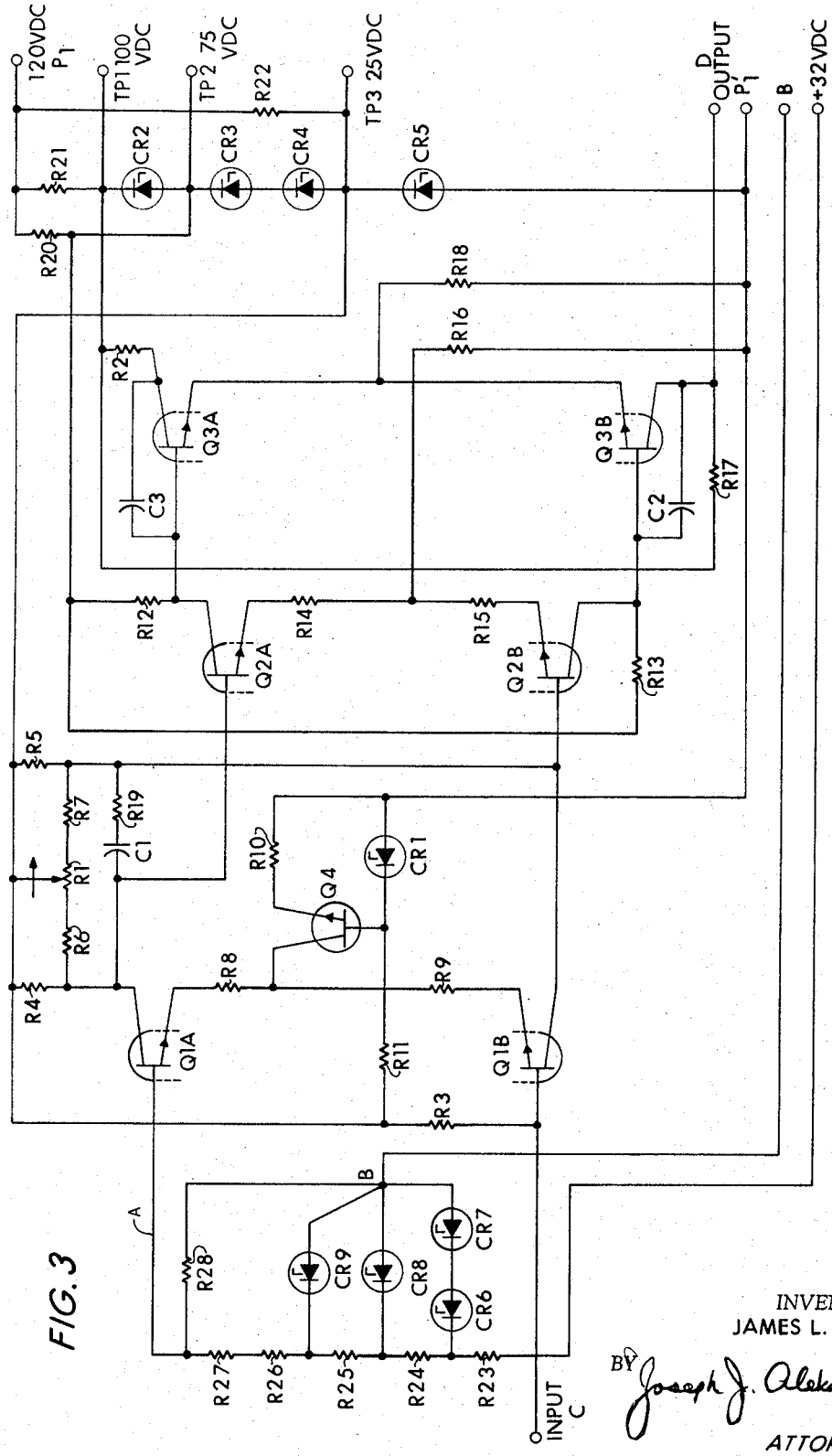
FIG. 3 is a schematic of one D-C feedback amplifier that may be incorporated in the switch of FIG. 2.

An amplifier particularly suited for use in the invention is shown in FIG. 3. This differential amplifier has a minimum gain of 500,000, a low break point frequency in the order of 100 c.p.s., a dynamic range of approximately $\pm 10$ volts, and an output impedance of 100K ohms. The alphabetical symbols of FIG. 3 are correlated with those of FIG. 2, and illustrate how the amplifier terminals may be connected to the remainder of the circuit. The actual input terminals of the amplifier are feedback terminal C and voltage reference terminal A. Voltage reference source $V_R$ is composed of parallel combination of Zener diodes CR6–CR9, and associated precision resistors R23–R28. Terminals A and C are respectively coupled to the input amplifier stage composed of dual transistor Q1A and Q1B. Resistors R4–R7 constitute the collector load resistors for transistors Q1A and Q1B. Variable resistor R1 provides a means for adjusting the feedback voltage $V_{SF}$ to the proper level, which in this amplifier is 6 volts. Resistor R19 and capacitor C1 provide compensation to stabilize the feedback loop.

In the differential amplifier art, the common mode rejection factor represents the figure of merit or performance factor of an amplifier. The rejection factor specifies the amplifier's ability to reject signals that are not actually differential. To improve the rejection factor of the present amplifier, a constant current source formed of transistor Q4 and Zener diode CR1 is coupled thru resistors R8 and R9 to the emitters of transistors Q1A and Q1B.

The second and third amplification stages comprise dual transistors Q2A, Q2B, and Q3A, Q3B and their respective collector and emitter resistors. Capacitors C2 and C3 are frequency compensating components. Serially connected Zener diodes CR2–CR5 and proximate resistors R20–R22 provide means for suitably dividing the power voltage applied to terminals $P_1$ and $P'_1$. The amplifier is designed to accommodate 120 v. D-C of power. Terminal D contains the constant output voltage V' of the amplifier, which is coupled to an emitter follower 52 of FIG. 2 to reduce the output impedance.

Where an odd number of amplification stages is employed, the relation between the input terminals and input stage transistors is as shown in FIG. 3. However, with an even number of amplification stages the input terminals should be reversed so as to maintain the negative feedback connection at the input of the amplifier. In other words, with an even number of stages, terminal C, transmitting feedback voltage $V_{SF}$, should be connected to the base terminal of transistor $Q_{1A}$, whereas, terminal A should be connected to the base of transistor $Q_{1B}$.

The amplifier components of FIG. 3 are specified below.

| Component | Description | Value | Tol., Percent | Power Rating (watts) |
|---|---|---|---|---|
| RESISTORS | | | | |
| R1 | Var | 50K | 5 | 1 |
| R2 | MF | 100K | 2 | ¼ |
| R3 | CF | 6.32M | 1 | ⅛ |
| R4 | WW | 35K | 1 | 1/10 |
| R5 | WW | 35K | 1 | 1/10 |
| R6 | MF | 175K | 1 | ⅛ |
| R7 | MF | 175K | 1 | ⅛ |
| R8 | WW | 50 | 1 | 1/10 |
| R9 | WW | 50 | 1 | 1/10 |
| R10 | WW | 3.3K | 1 | 1/10 |
| R11 | MF | 4.7K | 2 | ¼ |
| R12 | MF | 100K | 2 | ¼ |
| R13 | MF | 100K | 2 | ¼ |
| R14 | MF | 220 | 2 | ¼ |
| R15 | MF | 220 | 2 | ¼ |
| R16 | MF | 27K | 2 | ¼ |
| R17 | MF | 100K | 2 | ¼ |
| R18 | MF | 150K | 2 | ¼ |
| R19 | MF | 51 | 2 | ¼ |
| R20 | MF | 33K | 2 | ¼ |
| R21 | MF | 3.9K | 2 | ½ |
| R22 | WW | 15K | 5 | 5 |
| R23 | MF | 820 | 2 | ½ |
| R24 | WW | 400 | 1 | 1/10 |
| R25 | WW | 600–1200 | 1 | 1/10 |
| R26 | WW | 1–19 | 0.5 | 1/10 |
| R27 | WW | 100–500 | 0.02 | ⅛ |
| R28 | WW | 6K | 0.1 | ⅛ |
| R29 | MF | 100K | 2 | ¼ |
| CAPACITORS | | | | |
| C1 | Mylar | .082 μf | 5 | 200V |
| C2 | Cer | 37μμf | 10 | 100V |
| C3 | Cer | 37μμf | 10 | 100V |
| TRANSISTORS | | | | |
| Q1 | 2N2060 | | | |
| Q2 | 2N2060 | | | |
| Q3 | 2N2060 | | | |
| Q4 | 2N720A | | | |
| DIODES | | | | |
| CR1 | ES8532 | | | |
| CR2 | ES8975 | | | |
| CR3 | ES8975 | | | |
| CR4 | ES8976 | | | |
| CR5 | ES8975 | | | |
| CR6 | ES8544 | | | |
| CR7 | ES8544 | | | |
| CR8 | ES8548 | | | |
| CR9 | FBM2318932* | | | |

In connection with the above list of components:
 MF indicates metal film.
 CF indicates carbon film.
 WW indicates wire wound.
 *M.I.T. Specification number, diode manufactured by Transitron and Motorola Inc.

Although the invention has been described as incorporated in a specific embodiment, those skilled in the art may now make numerous modifications and departures from this specific embodiment without departing from the inventive concepts. For example, other kinds of range scalers other than the types shown may be used to extend the dynamic operating range of the amplifier. It is also possible that need for a range scaler could be totally eliminated if the amplifier employed has a large enough range to suit the specific application. Moreover, other amplifiers other than the kind described capable of providing a sufficiently stable output voltage are within the art and may be used in the invention. Consequently, in view of these and other possible modifications, the invention is to be construed as limited only by the spirit and scope of the appended claims.

I claim:

1. A multiple current level electronic switch incorporating a D-C amplifier with an output terminal supplying a substantially constant voltage to a given load, comprising, in combination with said amplifier,
 (a) signal coupling means in series with said load,
 (b) a plurality ($n$) of serially connected resistors each having a first and second terminal, the first terminal of the $n$th resistor in series with said load,
 (c) a like plurality ($n$) of transistors each having a collector, base and emitter terminal, the collector of the $n$th transistor coupled to the second terminal of the $n$th resistor and the collector of a decreasingly numbered transistor respectively coupled to the second terminal of a correspondingly numbered resistor,
 (d) a reference voltage potential coupled to said emitter terminals, and
 (e) triggering means coupled to the base terminal of each transistor for switching said transistors into an on and an off operating state.

2. A multiple current level electronic switch as defined in claim 1 wherein said signal coupling means comprises ($n-1$) consecutive parallel combinations of a resistive element and a shorting switch.

3. A multiple current level electronic switch incorporating an amplifier with a feedback terminal, a reference voltage point, a reference voltage coupled to said reference point the difference between the reference and feedback voltages constituting the input error signal to said amplifier, and an output terminal providing a substantially constant output voltage to a given load comprising, in combination with said amplifier,
 (a) signal coupling means in series with said load,
 (b) a plurality ($n$) of serially connected resistors each having a first and second terminal, the first terminal of the $n$th resistor in series with said load and coupled to said feedback terminal of said amplifier,
 (c) a like plurality ($n$) of transistors each having a collector, base and emitter terminal, the collector of the $n$th transistor coupled to the second terminal of the $n$th resistor and the collector of decreasingly numbered transistors respectively coupled to the second terminal of a correspondingly numbered resistor, and the collector terminal of the first transistor also being coupled to said reference voltage point of said amplifier,
 (d) a reference voltage potential coupled to said emitter terminals, and
 (e) triggering means coupled to the base terminal of each transistor for switching said transistors into an off and an on operating state.

4. A multiple current level electronic switch as defined in claim 3 wherein said signal coupling means comprises ($n-1$) consecutive parallel combinations of a resistive element and a shorting switch.

5. A multiple current level electronic switch incorporating an amplifier with a feedback terminal, a reference voltage point, a reference voltage coupled to said reference point, the difference between the reference and feedback voltages constituting the input error signal to said amplifier, and an output terminal providing a substantially constant output voltage to a given load, comprising, in combination with said amplifier,
 (a) signal coupling means in series with said load,
 (b) a first resistor having a first terminal in series with said load and coupled to said feedback terminal, and having a second terminal,
 (c) a second resistor having a first terminal coupled to said second terminal of said first resistor, and a second terminal,
 (d) a voltage reference potential,
 (e) a first transistor having collector, base and emitter terminals, said collector terminal parallel coupled to said second terminal of said second resistor and to said reference voltage point, and said emitter terminal coupled to said reference voltage potential,
 (f) a second transistor having collector, base and emitter terminals, said collector coupled to said first terminal of said second resistor, and said emitter coupled to said reference voltage potential, and
 (g) a flip-flop coupled to the base terminals of said first and second transistors for switching the operating states thereof.

6. A multiple current level electronic switch as set forth in claim 5 wherein said coupling means comprises a parallel combination of a resistive element and a shorting switch.

7. A multiple current level electronic switch as defined in claim 6 wherein said shorting switch comprises a transistor having its collector and emitter terminals connected across said resistive element, and its base terminal coupled to means for triggering said shorting switch transistor into an off and an on operating condition.

8. An electronic switch energized by a power source and supplying multiple current levels to a load, comprising:
(a) a differential amplifier having a feedback terminal, a voltage reference point, and further comprising;
  (1) a first amplification stage comprising first and second transistors each having a collector, emitter and base terminal and each having a resistive load connected between its collector terminal and said power source, said emitter terminals of said transistors joined through a pair of resistors, and the base terminal of said second transistor coupled to said feedback terminal,
  (2) a voltage reference source connected between said voltage reference point and the base terminal of said first transistor,
  (3) a constant current source coupled to the junction of said two resistors joining said emitters of said first and second transistors,
  (4) at least a final amplification stage comprising third and fourth transistors each having a collector, emitter and base terminal, the collector terminal of said transistors coupled through respective resistive loads to said power source, the base terminal of said third transistor receiving the signal output from said collector of said first transistor and the base terminal of said fourth transistor receiving said signal output from said collector of said second transistor, and the emitter terminal of said third transistor being coupled to the emitter terminal of said fourth transistor,
  (5) an emitter follower having a collector, base and emitter terminal, said collector coupled to said power source, said base of said follower coupled to said emitter terminals of said third and fourth transistors and said emitter of said follower coupled to said load,
(b) signal coupling means in series with said load, and
(c) a switching component in series with said load comprising;
  (1) a plurality ($n$) of serially connected resistors each having a first and second terminal, the first terminal of the $n$th resistor in series with said load and coupled to said feedback terminal of said amplifier,
  (2) a like plurality ($n$) of transistors each having a collector, base and emitter terminal, the collector of the $n$th transistor coupled to the second terminal of said $n$th resistor and the collector of decreasingly numbered transistors respectively coupled to the second terminal of a correspondingly numbered resistor, and the collector terminal of the first transistor also coupled to said reference voltage point of said amplifier,
  (3) a reference voltage potential coupled to said emitter terminals of said transistors of said switching component, and
  (4) triggering means coupled to the base terminal of each of said transistors of said switching component for switching said transistors into an off and an on operating state.

9. A multiple current level electronic switch as defined in claim 8 wherein said signaling coupling means comprises ($n-1$) consecutive parallel combinations of a resistive element and a shorting switch.

10. A multiple current level electronic switch as set forth in claim 9 wherein the number ($n$) of resistors and transistors in said switching component equals two and said triggering means comprises a flip-flop.

No references cited.

ARTHUR GAUSS, *Primary Examiner.*
R. H. PLOTKIN, *Assistant Examiner.*